United States Patent [19]

Nill

[11] Patent Number: 4,782,782

[45] Date of Patent: Nov. 8, 1988

[54] TRANSMISSION POSITION INDICATOR MECHANISM

[75] Inventor: Walter J. Nill, Davison, Mich.

[73] Assignee: General Motors Corporation, Detroit, Mich.

[21] Appl. No.: 112,370

[22] Filed: Oct. 26, 1987

[51] Int. Cl.$^4$ .............................................. G01D 7/00
[52] U.S. Cl. ................................ 116/28.1; 116/28 R; 116/DIG. 20; 340/52 F; 307/10 R; 307/115; 200/61.35
[58] Field of Search ...................... 116/28.1, 28 R, 29, 116/31, DIG. 20, 281, 282, DIG. 21, 297; 340/52 R, 52 F, 62, 70, 74, 79; 74/473 P, 473 R; 200/61.33, 61.34, 61.35, 61.54, 61.88; 307/115, 10 R; 180/154; 280/419

[56] References Cited

U.S. PATENT DOCUMENTS

| | | | |
|---|---|---|---|
| 2,045,985 | 6/1936 | Franz | 116/DIG. 21 |
| 2,400,553 | 5/1946 | Howard | 116/124 |
| 3,538,881 | 11/1970 | Fenwick | 116/129 |
| 4,580,518 | 4/1986 | Scanlon et al. | 116/DIG. 20 |

Primary Examiner—William M. Shoop, Jr.
Assistant Examiner—Paul Ip
Attorney, Agent, or Firm—Donald F. Scherer

[57] ABSTRACT

A transmission shift position indicator has a rotatable drum with a cam track formed in the outer periphery thereof. A cam follower is disposed in the cam track and operatively connected to a housing through a base portion for linear movement thereon in response to rotation of the drum. The base portion has a pointer connected thereto which is alignable with indicia imprinted on the housing to indicate the selected transmission operating condition. The cam track has portions thereof formed oblique to the longitudinal axis of the drum which cooperate with the follower to cause the linear movement of the base portion and circumferential portion transverse to the longitudinal axis interconnected by adjacent oblique portions for permitting the pointer to dwell at selected indicia position during rotation of the drum.

2 Claims, 2 Drawing Sheets

TRANSMISSION POSITION INDICATOR MECHANISM

BACKGROUND OF THE INVENTION

This invention relates to position indicating mechanisms, and more particularly, to indicating mechanisms which signify the transmission operating position as selected by an operator.

In the prior art, it is well known to provide a "zeroing" or initial setting of the transmission shift indicator at assembly. Some of these prior art arrangements are shown in the U.S. Pat. Nos. to Thornburgh et al. 2,925,061 issued Feb. 16, 1960; Dennis 4,446,809 issued May 8, 1984; and Scanlon et al. 4,580,518 issued Apr. 8, 1986.

Thornburgh et al. utilizes a clip member to connect a drive cable between the steering column in the transmission indicator mechanism. By manipulating the clip on the steering column at assembly, the indicator pointer is set to a selected operating position. Alignment of the indicator pointer with the other transmission positions is dependent upon the tolerances of the various components within the indicator mechanism and the transmission shift mechanism.

Dennis utilizes a movable lens member on which the operating indicia is imprinted. This lens is movable within a housing to permit proper alignment of one of the indicia and pointer at assembly. As with Thornburgh et al., alignment between the indicator and the other transmission operating conditions is dependent upon tolerances within the system.

Scanlon et al. describes an indicator mechanism wherein a ratchet and pawl is disposed between the operator lever and the indicator pointer to permit lost motion between the two members when the operator lever is moved to a predetermined position thus accomplishing the "zeroing" of the indicator mechanism. As with the above-mentioned prior art, alignment of the pointer during other transmission operating conditions is dependent upon the manufacturing tolerances.

SUMMARY OF THE INVENTION

The present invention seeks to ensure that proper alignment between the indicator and the indicia will occur at each of the transmission operating conditions while permitting less stringent tolerances within the transmission shift linkage and the indicator mechanism. The present invention, if desired, can utilize some of the prior art "zeroing" features to permit the establishment of a relationship between one operating position in the transmission and the indicator pointer of the shift indicator mechanism.

The proper alignment of the indicator with the other operating indicia is accomplished through the use of a rotary drum having a cam track formed thereon and a cam follower which engages the cam track and provides linear movement for the indicator member. The cam track has dwell portions formed therein which are aligned with respective ones of the transmission operating positions. Whenever the cam follower is disposed in a dwell portion, the indicator pointer will be aligned with one of the indicia.

The dwell portions will maintain the indicator in alignment with the selected indicia for a predetermined angular rotation of the drum. The dwell portions are interconnected by portions of the cam track which are oblique to the dwell portions. These oblique portions provide for movement of the indicator from one indicia to the next.

It is therefore an object of this invention to provide an improved transmission indicator mechanism wherein the indicator pointer is driven by a cam follower which engages a cam track in a rotatable drum and wherein the cam track has dwell portions which maintain the indicator aligned with an indicia for a predetermined angle of rotation of the drum.

It is another object of this invention to provide an improved transmission shift indicator mechanism wherein a housing has imprinted thereon indicia representing the transmission operating conditions and slidably mounted thereon an indicator pointer which is selectively alignable with the indicia, and further wherein a cam follower is connected with the indicator and drivingly disposed in a cam track formed on the outer periphery of a rotatable drum, and also wherein the cam track has a plurality of circumferentially extending portions aligned with the indicia and oblique portions formed oblique to the longitudinal axis of the drum and interconnecting the circumferential portions so that upon rotation of the drum by an operator will result in movement of the indicator between adjacent indicia when the cam follower engages an oblique portion and alignment with respective indicia when the cam follower engages a circumferential portion.

These and other objects and advantages of the present invention will be more apparent from the following description and drawings.

DESCRIPTION OF THE PREFERRED EMBODIMENT

Figure 1:
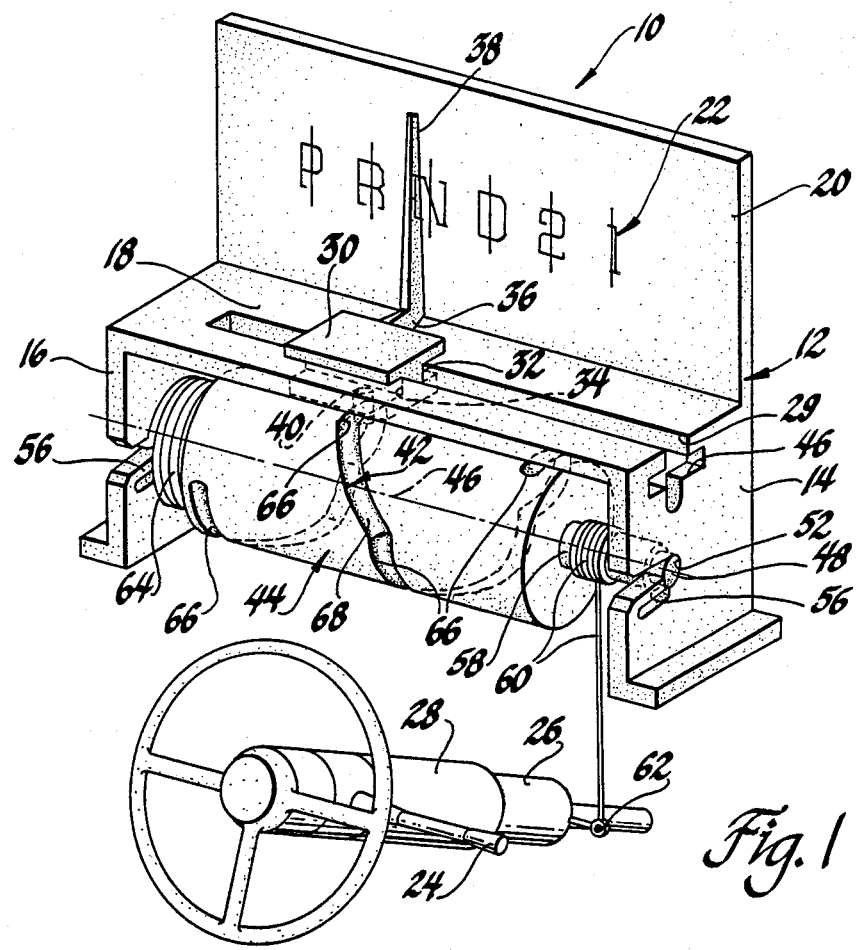
FIG. 1 is an isometric view of a transmission mechanism incorporating the present invention an a diagrammatic representation of a steering column and shift lever.
Figure 2:
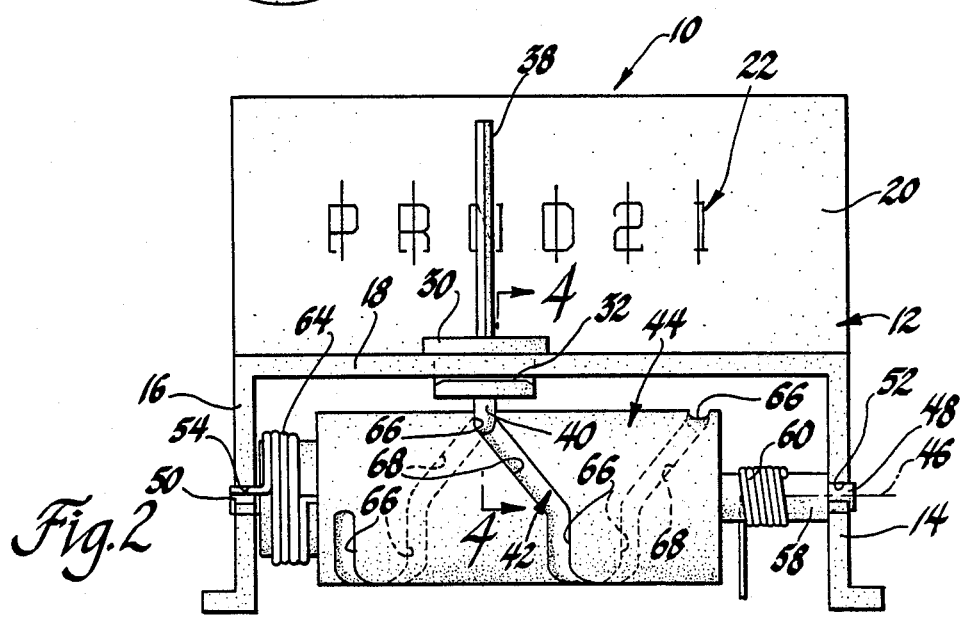
FIG. 2 is a front elevational view of the indicator mechanism.
Figure 3:
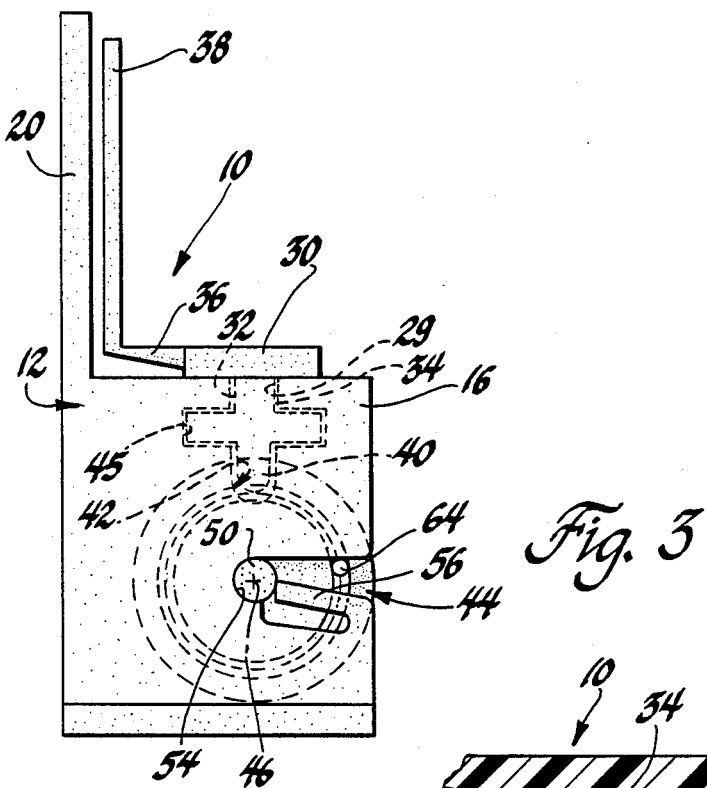
FIG. 3 is a side elevational view of the indicator mechanism.

Referring to the drawings, wherein like characters the same or corresponding parts throughout the several views, there is seen primarily in FIGS. 1 through 3, a transmission indicator mechanism, generally designated 10. This mechanism 10 has a housing 12 which includes a pair of end walls 14 and 16, a horizontal or table portion 18 and a vertical or back portion 20. The vertical portion 20 has indicia 22 imprinted thereon. This indicia represents the transmission operating conditions such as park (P), reverse (R), neutral (N), drive (D), intermediate (2) and low (1).

The transmission operating condition is selected by an operator through manipulation of a transmission shift lever 24 which is operatively disposed on a steering column, generally designated 26. The shift lever 24 and steering column 26 are conventional components and their design and operation is well known. I is also well known that the shift lever 24 is connected through a shift linkage, not shown, to a power transmission, also not shown. The transmission shift lever 24 is also connected to a rotatable member or shift bowl 28 disposed on the steering column 26.

Figure 4:
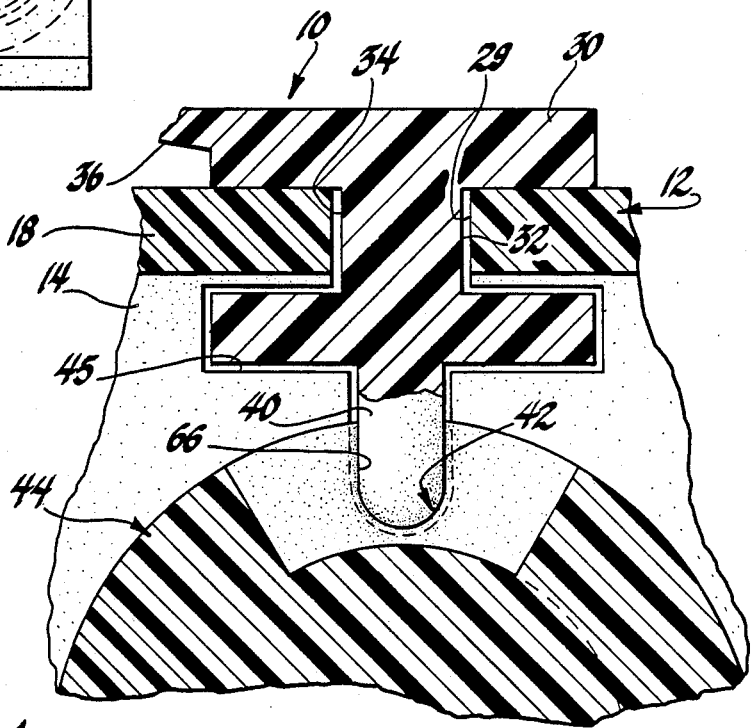
FIG. 4 is a sectional view taken along line 4—4 of FIG. 2.

The horizontal portion 18 has a guide opening 29 formed therein which cooperates with a slidable base member 30. The base member 30 has formed therein a pair of guide slots 32 and 34, as best seen in FIG. 4. The guide slots 32 and 34 maintain the base member 30 within the guide opening 29. The base member 30 has formed integrally therewith an extension 36 and an indicator or pointer 38. The point 38, as best seen in FIGS. 1 and 2, is alignable with the indicia 22 imprinted on the vertical portion 20. The base member 30 also has formed integrally therewith or otherwise secured thereto, a cam follower portion 40 which is engaged with a cam track 42 formed in a rotatable drum 44. The end wall 14 has an opening 45 which permits insertion of the base member 30 into the guide opening 29.

The drum 44 has a longitudinal axis 46 about which are disposed a pair of axles 48 and 50. The axles 48 and 50 are journalled in circular openings 52 and 54, respectively, which are formed in respective end walls 14 and 16. Each end wall 14 and 16 has a flexible finger portion 56 which deflects to permit insertion of a respective axle in each end wall and then returns to the position shown to prevent the drum 44 from inadvertently escaping the housing 12.

The drum 44 has a drive hub 58 about which is wrapped a cable 60 having one end 62 thereof connected with the rotatable member 28. The cable 60 will cause rotation of the drum 44 when the shift lever 24 is pivoted in a clockwise direction on the steering column 26. A return spring 64 is operatively connected between end wall 16 and the drum 44 to cause rotation of the drum 44 when the shift lever 24 is manipulated in a counterclockwise direction on the steering column 26.

The cam track 42 has a plurality of circumferentially extending portions 66. These portions 66 are substantially perpendicular to the longitudinal axis 46 of the drum 44. Each of the portions 66 is connected to the next adjacent portion 66 by respective oblique portions 68. The oblique portions 68 are disposed obliquely to the longitudinal axis 46 of the drum 44. As best seen in FIGS. 1 and 2, the endmost portions 66 are connected to only one oblique portion 68 whereas the intermediate portions 66 are connected to two oblique portions 68.

As previously mentioned, the cam follower 40 is engaged in the cam track 42. As the drum 44 is rotated through manipulation of the shift lever 24, movement of the cam follower 40 will be positioned by the cam track 42. Since the cam follower 40 is integral or otherwise secured to the pointer 38, the pointer 38 will be positioned by rotation of the drum 44.

Whenever the cam follower 40 is operated on by an oblique portion 68, the base member 30 will be driven linearly in the guide opening 29, such that the pointer 38 will move from one indicia to the next while the drum 44 is rotating. When the cam follower 40 is engaged in a circumferential portion 66, the base member 30 will be stationary in the guide opening 29 and the pointer 38 will be aligned with one of the indicia 22, whether the drum 44 is rotating or stationary. Therefore, the portions 66 provide dwell points for the base member 30 and the indicator 38. Since these dwell points are readily alignable with the indicia 22 at assembly, the indicator 38 can easily be maintained in alignment with the respective indicia. By controlling the length of the portions 66, the amount of drum rotation during which a dwell period will occur is controlled. With modern manufacturing techniques, such as injection molding, the shape of cam track 42 can be maintained to close tolerances inexpensively.

It should now become apparent that this dwell period permits the shift never 24 to have a degree of angular movement during which the pointer 38 will be aligned with one of the indicia. Therefore, it should be recognized that the tolerances between the shift lever 24 and the shift lever mechanism can be held to less stringent requirements which, of course, reduces manufacturing costs and also permits a wider latitude of the types of shift linkages that can be utilized with a given indicator mechanism.

In other words, an indicator mechanism constructed in accordance with the present invention could be utilized with shift linkages for both front wheel drive and rear wheel drive type vehicles. The linkages of these vehicles are considerably different, however, they each have a detent mechanism disposed within their respective transmissions which establishes the nominal angular movement between operating positions. However, the angular movement of the shift lever may vary from transmission to transmission. The dwell portions of the cam track 42 can be relocated to compensate for those variances.

The embodiments of the invention in which an exclusive property or privilege is claimed are defined as follows:

1. A transmission position indicator comprising: operator controlled transmission shift lever means for permitting establishment of a plurality of transmission operating positions including park, reverse, neutral and drive positions, upon movement by an operator; rotatable drum means having a cam track thereon, said cam track having a plurality of paths oblique to the longitudinal axis of the drum means and a plurality of circumferentially extending paths with each of said last named paths joining successive pairs of said first named paths to form said cam track whereby said cam track is continuous from end to end; housing means rotatably supporting said drum means and having disposed thereon indicia means for indicating the transmission positions; indicator pointer means for cooperating with said indicia means for indicating the position established; cam follower means secured to the indicator pointer means and being disposed in said cam track, said indicator pointer means being guided on said housing for linear movement enforced by rotary movement of said drum means through the cooperation of said cam track and said cam follower means, said indicator pointer means being stationary relative to said indicia means and aligned with a transmission operating position when said cam follower means is disposed in on of said circumferentially extending paths and being moved between successive operating positions when said cam follower means is disposed in any of said oblique paths and said drum means is rotating; and means interconnecting said drum means and said shift lever means for rotating said drum means when said shift lever means is moved by said operator.

2. A transmission position indicator comprising: operator controlled transmission shift lever means for permitting establishment of a plurality of transmission operating positions including park, reverse, neutral and drive positions, upon movement by an operator; housing means having disposed thereon indicia means for indicating the transmission positions; rotatable drum means rotatably supported in said housing means and having a cam track thereon, said cam track having a plurality of dwell portions extending circumferentially and being aligned with respective indicia and a plurality of oblique portions extending obliquely to the longitudinal axis of the drum means with each of said oblique portions joining successive pairs of said dwell portions to form said cam track whereby said cam track is continuous from end to end; indicator pointer means for cooperating with said indicia means for indicating the position established; cam follower means secured to the indicator pointer means and being disposed in said cam track, said indicator pointer means being guided on said housing for linear movement enforced by rotary movement of said drum means through the cooperation of said cam track and said cam follower means, said indicator pointer means being stationary relative to said indicia means and aligned with respective transmission operating positions when said cam follower means is disposed in respective ones of said dwell portions and being moved between successive operating positions when said cam follower means is disposed in said oblique portions and said drum means is rotated; and means interconnecting said drum means and said shift lever means for rotating said drum means when said shift lever means is moved by said operator.

* * * * *